April 13, 1965   D. R. CRAMER   3,177,828
PLANTER HITCH FRAME ASSEMBLY
Filed Aug. 5, 1959
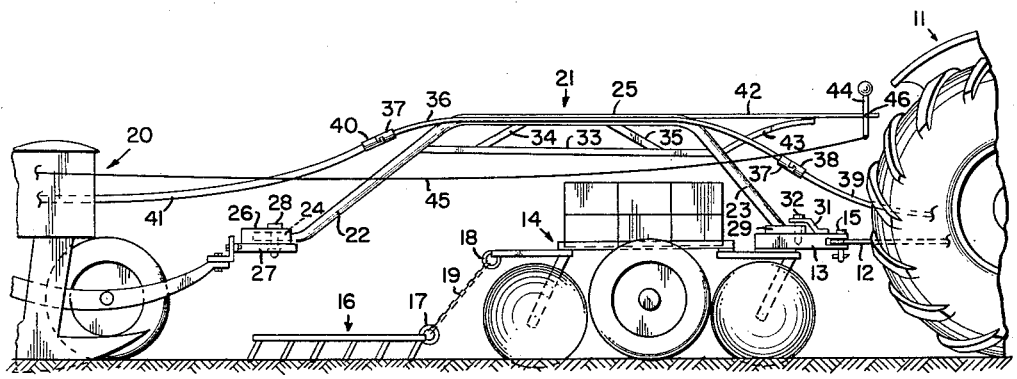
FIG. I
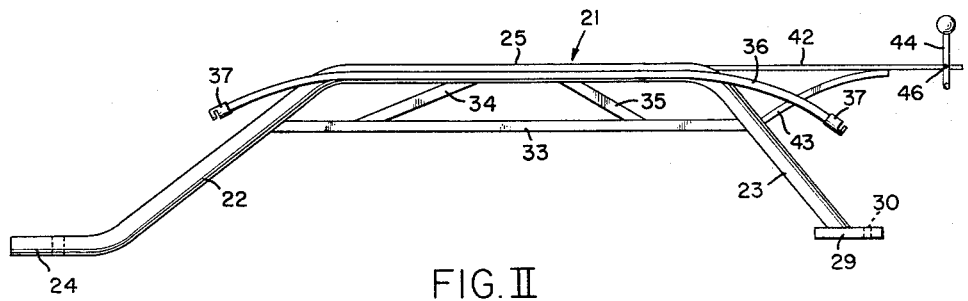
FIG. II
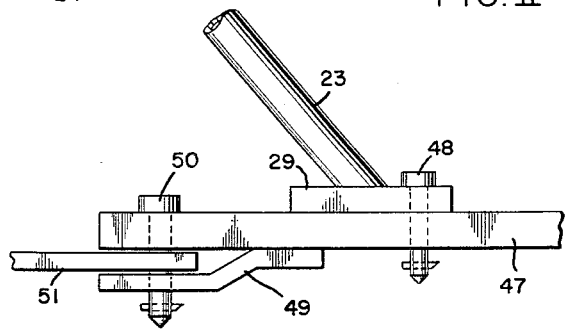
FIG. III
INVENTOR
DON R. CRAMER
BY
ATTORNEY

United States Patent Office 3,177,828
Patented Apr. 13, 1965

3,177,828
PLANTER HITCH FRAME ASSEMBLY
Don R. Cramer, Clarion, Iowa, assignor of one-third to Ray V. Bailey, Clarion, Iowa
Filed Aug. 5, 1959, Ser. No. 831,901
6 Claims. (Cl. 111—52)

This invention relates to the trailing of equipment and at the present time appears to have its greatest application in the trailing of seed planters although it is by no means limited thereto.

When preparing a field for the planting of seed such as corn, it is the usual practice to first traverse the field with an implement adapted to knock down and break up the residue of the preceding crop after which the field is plowed with a plow of the moldboard type to turn up soil which has been beneath the surface. The normal result of the latter operation is a relatively exceedingly rough field surface due to the fact that much of the upturned ground is in the form of large clods and chunks. These clods and chunks are, of course, wholly unadapted to the planting of any seed and must be broken up into small, friable bits before the planting operation can proceed. To accomplish this end the common practice is to traverse the field at least twice with a tractor pulling a disk harrow (commonly known as a "disk") and to then go over the field a third time with the tractor pulling a rigid toothed implement called a drag harrow or drag. These operations having been completed, the field is ready for planting which, of course, entails traversing the field a fourth time with a tractor, this time pulling the planter. Should it happen, as is often the case, that it rains between the time that the dragging is completed and the time it is possible to start planting, one or more additional coverages of the field will usually be required with a tractor pulling a disk or a drag. In fact it is not at all uncommon for planting to be delayed beyond the ideal planting season due to repeated rains, each coming while an attempt is being made to again ready the field for planting or after it has been again so readied but before the planting operation could be completed.

The disadvantages of the historical routine are several. For one thing it is expensive to drive a tractor over a field so many times not only from the standpoint of the quantities of gasoline and oil consumed but also from the standpoint of the wear and tear on the tractor itself which takes a terrific shaking each time it crosses a rough field. Further there is the matter of the cost of the manpower required to drive the tractor. Aside from the cost factor, the mere traversing of the ground so many times with the tractor has a tendency to pack it and to have an adverse effect on crop yields and, as previously inferred, the time consumed also often results in reduction in yield due to the planting operation having been delayed beyond the ideal period for planting.

The foregoing disadvantages are eliminated by my invention since the mechanism and process which I teach enable the double disking, dragging and planting to all be accomplished by a single coverage of the field. Thus, when a day arrives that is suitable for doing field work, I can go out and plant that day rather than being required to spend that day and several others just getting the field ready to plant. As a matter of fact my invention could be used to break up the previous crop residue, plow, double disk, drag and plant all in one traversing of the field; however, since it is commonly accepted to be desirable that the plowing be done some time ahead of planting on certain types of ground in order that the clods and chunks may have an opportunity to "weather," I have herein illustrated my invention as performing only the double disking, dragging and planting operations simultaneously, these being almost universally accepted as following one another in quick succession.

The idea of performing several field operations during one coverage of the field is not new but in the past in has not been possible to satisfactorily plant by trailing the planter behind other implements because it has not been possible to adequately control its movement and the locations of the hills of seed have accordingly been too uneven.

It is an object of this invention to provide a method of planting which minimizes the likelihood of the planting operation being unduly delayed by weather conditions.

Another object of this invention is to provide a method and a means which enable a material reduction in the number of trips across a field which are required in order to complete the operation of planting.

A further object of this invention is to teach a method of planting seed which enables preparation of the seed bed together with controlled and accurate planting of the seed during a single traversing of the field.

Yet another object of this invention is to provide means for executing said latter method.

A still further object of this invention is to teach a method of trailing or towing a plurality of implements or items of equipment behind a guidable vehicle in which some items are disposed approximately behind others but in which the position and path of travel of the rearmost implement is directly controlled by the movement of said guidable vehicle.

An additional object of this invention is to provide means for hitching to a guidable vehicle an implement which is spaced from said guidable vehicle by other equipment.

Other objects of this invention will appear as the present disclosure proceeds.

Basically, in its preferred form, my invention comprises the process of trailing a planter behind implements for readying the ground for planting, said latter implements being towed by a farm tractor to which the planter is also directly or substantially directly attached. In executing my planting process, I prefer to employ a relatively long tongue member which attaches at one of its ends to the planter and at its other end to the tractor draw-bar or to a point adjacent the same, the central section of the said tongue being offset upwardly to avoid interference with the ground readying implements disposed between the said tractor and planter.

In order that a clearer understanding of my invention may be had, reference is made to the accompanying drawings which form a part of this specification and in which:

FIGURE I is a side elevation of an assembly of implements arranged to embody and illustrate my invention, the elongated tongue which I have mentioned above being shown in operative position.

FIGURE II is a side elevation of the detached tongue assembly, the same being shown enlarged.

FIGURE III is a side elevation of the tractor end of the tongue together with adjacent parts, illustrating a highly acceptable alternative form of the front hitch.

Referring now to the drawings in greater detail, reference character 11 designates a farm tractor of any type to the drawbar 12 of which is hitched the stub tongue 13 of the tandem disk 14 by means of pin 15. To the rear of the disk 14 is hitched a drag 16 by means of rings 17 and 18 and chain 19. Disposed to the rearward of the drag 16 is the planter 20 which is directly connected to a point near the tractor by the tongue which has been designated generally by the reference character 21.

I have found that the tongue 21 may well be formed from an elongated steel tube. In the embodiment shown in the drawing, the said tube has been bent to provide downwardly and outwardly inclined portions 22 and 23, leaving the rear end 24 and the mid-section 25 disposed in generally horizontal planes when the tongue is in operative position. The said rear end 24 is received in a larger stub tube 26 which has been secured to the drawbar 27 of the planter 20 and is held in operative relationship thereto by hitch pin 28. At the forward end of the tongue a plate member 29 has been secured to the lower end of the inclined portion 23 and provided with an orifice 30. To cooperate with said plate 29 to provide a horizontally pivotal hitch, a Z member 31 has been attached to the top portion of the tongue 13 of the disk 14 and a pin 32 has been installed in suitable orifices in said Z member 31 and tongue 13, passing also through the orifice 30 in plate 29. In order to reinforce the tongue 21 in its offset portion a horizontal bar 33 and angling bars 34 and 35 have been provided. On each side of the central horizontal section 25 a pipe or conduit 36 has been attached, the one on the remote side being obscured in the drawing by the one on the side facing the viewer. To each end of each said conduit 36 a coupling member 37 has been secured adapted to cooperate with the coupling members 38 of the hoses 39 of the tractor hydraulic system and with the coupling members 40 of the hoses 41 of the hydraulic system of the planter 20 to provide the same hydraulic control of planter operations as is had when my invention is not in use. In order to enable the tractor operator to select the planter marker which he desires to have in operation at a given time an extension arm 42 supported by brace 43 has been provided to mount lever 44 which is operatively connected to the marker controls of the planter by wire or light chain 45. The pivot 46 of lever 44 is preferably of the friction type so that the lever 44 will remain in the position selected until again moved by the tractor operator.

In the modification shown in FIGURE III the front end of tongue 21 is hitched directly to the drawbar of the tractor rather than to a member disposed adjacent thereto as in FIGURES I and II. In FIGURE III reference character 47 has been used to designate the tractor drawbar to which plate 29 of tongue 21 is attached by hitch pin 48. An offset member 49 has been attached to the under side of a drawbar 47 to cooperate with the outer end of said drawbar and with hitch pin 50 to attach tongue 51 of the disk to the tractor.

As has been pretty much indicated hereinabove my process entails the towing of an item of equipment at a substantial distance to the rearward of a vehicle which is being guided by an operator, the same being done in a manner such that the movement of said item of equipment is subject to definite control by manipulation of the position of said guided vehicle. Since the prime mover in a tow train is normally the vehicle which is also directly guided by the operator, the said guided vehicle will normally be also the prime mover. In order to carry out my process with the greatest efficiency, I hitch the remotely towed implement directly to the operator guided vehicle or substantially so.

While the offset tongue disclosed herein constitutes a highly effective means adapted to assist in carrying out my process, it is by no means the only general type of assembly which may be used. Moreover, the tongue member, if one is used, may be permanently attached to the tractor or to the planter, or to their respective replacements; in fact the forward end could be attached to the tractor and the rearward end to the planter and the two segments hitched together at their free ends. If a tongue of the general type shown is used, it is not essential that the connection to the planter be of the relatively rigid type and/or that the connection to the tractor be of the swivel type. Further the offset in the tongue could be downward or sideways rather than up or it could be eliminated and the intervening implements formed to provide clearance for the said tongue. Obviously, if an offset tongue is used, it need not be of the configuration shown; for example, it could resemble an arc of an ellipse and the reinforcing, if used, and the hitches could be of any suitable type. The conduits and the marker control lever may be eliminated or altered.

The fact that the hitch need not be made directly to the guidable vehicle is emphasized by the fact that in the embodiment which I have made and which is illustrated in greatest detail herein it is to the tongue of the implement immediately behind the tractor; however, relative proximity is to be desired for most effective control.

While I have emphasized the use of my invention to trial a planter because the accurate replacement of seed is important, it may, of course, be used to tow other implements and equipment. Also, it is not necessary that it be the rearmost implement in the train which is towed according to my invention and it is not necessary that only one implement in a given train be so towed. In fact all implements in a train may, in accordance with my invention, be hitched directly to the guidable vehicle or to points adjacent thereto. In such an assembly a plurality of tongues could be offset one above another and a single, vertical, elongated hitch pin at the guidable vehicle could receive the front hitches of all of the several said tongues, the construction being such that each said front hitch can turn on said pin relative to the other said front hitches.

Although many modifications, including those enumerated above, may be made in my invention without departing from its spirit and scope, it should not be assumed that the same degree of effectiveness will be attained in all instances.

In addition to the several benefits mentioned earlier as being provided by my invention such as reduction of costs, saving of time, avoiding excessive packing of the field and substantial insurance of timely planting, I have found that the practicing of my invention evidently assists in weed control and I have concluded that the reason is that when my invention is employed, the crop being planted has an opportunity to get a head start on the weeds since the latter are destroyed immediately prior to the planting of the crop seed.

Although it is by no means essential to my invention, I find that in practicing my invention with a four row planter it is to advantage to make three trips around a field, beginning adjacent the outer edge thereof, before starting to travel back and forth. This procedure results in twelve "end rows" which is normal under presently used methods of planting.

In the claims which follow, the term "planter," where consistent, has been employed to designate all types of seeding and planting implements and it should be further understood that it is my intention in the ensuing claims to cover all changes in and modifications of the examples of my invention herein chosen for purposes of the disclosure, which do not constitute departures from the spirit and scope of the invention.

I claim:

1. A combination for preparing a seed bed and simultaneously planting the same comprising a guidable prime mover, a first implement frame, a soil working tool on said first implement frame, a tongue on said implement frame extending forwardly of said tool, coupling means on the forward portion of said tongue for horizontally pivotally interconnecting the first implement frame to the prime mover, a second implement frame disposed behind the first implement frame, a seed planter on said second implement frame, hitch means on said tongue between the coupling means and said soil working tool, and an elongated tongue attached at one of its ends to said second implement frame and having its other end horizontally pivotally attached to said hitch means whereby said first implement frame is free to sway laterally in trailing relation to said coupling means and said second implement frame is free to sway laterally in trailing relation to said hitch means.

2. The combination of claim 1 in which the elongated tongue is offset upwardly in its central portion to provide clearance for the first implement frame.

3. The combination of claim 1 in which the attachment of the elongated tongue to the second implement frame is rigid.

4. The combination of claim 1 in which the elongated tongue is offset upwardly in its central portion to provide clearance for the first implement frame and in which the attachment of said elongated tongue to the second implement frame is a rigid attachment.

5. A combination for preparing a seed bed and simultaneously planting the same comprising a guidable prime mover, a first implement frame, a soil working tool on said first implement frame, a single coupling means for horizontally pivotally interconnecting the first implement frame to the prime mover, draft member on the first implement frame extending forwardly therefrom and operatively connecting said coupling means to said first implement frame, a second implement frame disposed behind the first implement frame, a seed planter on said second implement frame, hitch means on the draft member disposed between the coupling means and the soil working tool, and an elongated tongue attached at one of its ends to said second implement frame and having its other end horizontally pivotally attached to said hitch means whereby said first implement frame is free to sway laterally in trailing relation to said coupling means and said second implement frame is free to sway laterally in trailing relation to said hitch means.

6. A combination for preparing a seed bed and simultaneously planting the same comprising a first implement frame, a soil working tool on said first implement frame, a tongue on said implement frame extending forwardly of said tool, coupling means on the forward portion of said tongue for horizontally pivotally interconnecting the first implement frame to a guidable vehicle, a second implement frame disposed behind the first implement frame, a seed planter on said second implement frame, hitch means on said tongue between the coupling means and said soil working tool, and an elongated tongue attached at one of its ends to said second implement frame and having its other end horizontally pivotally attached to said hitch means whereby said first implement frame is free to sway laterally in trailing relation to said coupling means and said second implement frame is free to sway laterally in trailing relation to said hitch means.

References Cited by the Examiner

UNITED STATES PATENTS

| | | | |
|---|---|---|---|
| 7,163 | 3/50 | Flory | 111—1 |
| 869,660 | 10/07 | Schultz | 172—178 |
| 1,012,220 | 12/11 | Pearson | 280—412 |
| 1,493,448 | 5/24 | Krotz | 111—1 X |
| 1,872,066 | 8/32 | Erdman | 111—52 |
| 2,190,655 | 2/40 | Filler | 111—63 |
| 2,306,388 | 12/42 | Johnson | 280—493 |
| 2,449,062 | 9/48 | Dewey | 111—59 X |
| 2,838,017 | 6/58 | Waldron | 111—63 |
| 2,840,392 | 6/58 | Miles | 280—493 |
| 2,869,895 | 1/59 | Tkachyk | 280—411 |
| 2,923,364 | 2/60 | King | 172—678 |
| 2,940,531 | 6/60 | Schaap | 172—26 |

FOREIGN PATENTS 886,890   7/43   France.

ABRAHAM G. STONE, *Primary Examiner.*

A. JOSEPH GOLDBERG, T. GRAHAM CRAVER, WILLIAM A. SMITH III, *Examiners.*